Patented Sept. 2, 1952

2,609,386

UNITED STATES PATENT OFFICE 2,609,386

CARBAMATE OF 3-ORTHO-TOLOXY-1,2-PROPANEDIOL

William A. Lott, Maplewood, and Edward Pribyl, Metuchen, N. J., assignors to E. R. Squibb & Sons, New York, N. Y., a corporation of New York No Drawing. Application July 26, 1951, Serial No. 238,784

1 Claim. (Cl. 260—482)

This invention relates to, and has for its object the provision of, new and advantageous derivatives of the compound 3-ortho-toloxy-1,2-propanediol, and a method of preparing said derivatives. The compound 3-ortho-toloxy-1,2-propanediol has muscle-relaxing properties, and is widely and successfully employed in the treatment of spastic and neuromuscular disorders.

Prior to this invention, a number of esters of 3-ortho-toloxy-1,2-propanediol had been prepared, but such derivatives were found to have little or no muscle-relaxing activity, contraindicating further investigation in the direction of such derivatives.

The derivatives of this invention are esters, but in contrast with the esters prepared prior to this invention, are relatively active; and they are advantageous in that on parenteral administration they provide a more prolonged muscle-relaxing action than 3-ortho-toloxy-1,2-propanediol.

The derivatives of this invention are the carbamates of 3-ortho-toloxy-propanediol, the preferred derivative being 3-(ortho-toloxy)-2-hydroxy-propyl carbamate, i. e.

$C_6H_4(CH_3)—OCH_2CHOHCH_2O—CONH_2$

These derivatives are readily obtainable in high yield by interacting 3-ortho-toloxy-1,2-propanediol with phosgene, and treating the reaction product with ammonia.

The following examples are illustrative of the invention:

Example 1

A solution of 32 g. (0.30 mole) phosgene in 200 ml. benzene is added dropwise at 30° C. to a stirred solution of 58.5 g. (0.32 mole) 3-ortho-toloxy-1,2-propanediol in 400 ml. benzene. The mixture is stirred for an hour after the addition is completed; and a solution of 39 g. dimethylaniline in 100 ml. benzene is then added, and stirring continued for a half hour. Ice water (about one-third volume) is then added, and the benzene layer formed is separated and stirred with 500 ml. concentrated ammonia at 5° C. for six hours. The precipitated solid (weighing about 55 g.) is recovered and recrystallized from water.

The product thus obtained in a yield of about 53 g. is 3-(ortho-toloxy)-2-hydroxy-propyl carbamate; it is a crystalline solid melting at about 93° C., and having a lower water-solubility and higher oil-solubility than 3-ortho-toloxy-1,2-propanediol.

Example 2

By using twice the amount of phosgene and ammonia used in Example 1, the dicarbamate of 3-ortho-toloxy-1,2-propanediol is obtained.

The derivatives of this invention may be embodied in the same pharmaceutical forms as 3-ortho-toloxy-1,2-propanediol, e. g. capsules, tablets, solutions and elixirs; and may be administered in the same manner and in substantially equivalent doses (based on potential unesterified diol) as 3-ortho-toloxy-1,2-propanediol. When administered parenterally in aqueous suspension, 3-(ortho-toloxy)-2-hydroxy-propyl carbamate gives a more prolonged muscle relaxation than an equivalent dose of 3-ortho-toloxy-1,2-propanediol in aqueous solution. The suspension may be obtained by micronizing the carbamate and/or suspending it with the aid of an intramuscularly-acceptable surface-active agent (e. g. a polyoxyethylene ether of a partial higher fatty acid ester of sorbitan) and an intramuscularly-acceptable hydrophilic colloid (e. g. a sodium carboxymethylcellulose).

The invention may be variously otherwise embodied—as by putting the derivative of this invention into other pharmaceutical forms adapted to utilize its different properties, such as solubility—within the scope of the appended claim.

We claim:

3-(ortho-toloxy)-2-hydroxy-propyl carbamate.

WILLIAM A. LOTT.
EDWARD PRIBYL.

REFERENCES CITED

The following references are of record in the file of this patent:

FOREIGN PATENTS

| Number | Country | Date |
|---|---|---|
| 269,938 | Germany | Feb. 2, 1914 |